March 13, 1956     F. J. ZAMBONI     2,738,170
REFRIGERATED MILK STORAGE TANK AND PASTEURIZER
Filed July 25, 1949     3 Sheets-Sheet 1
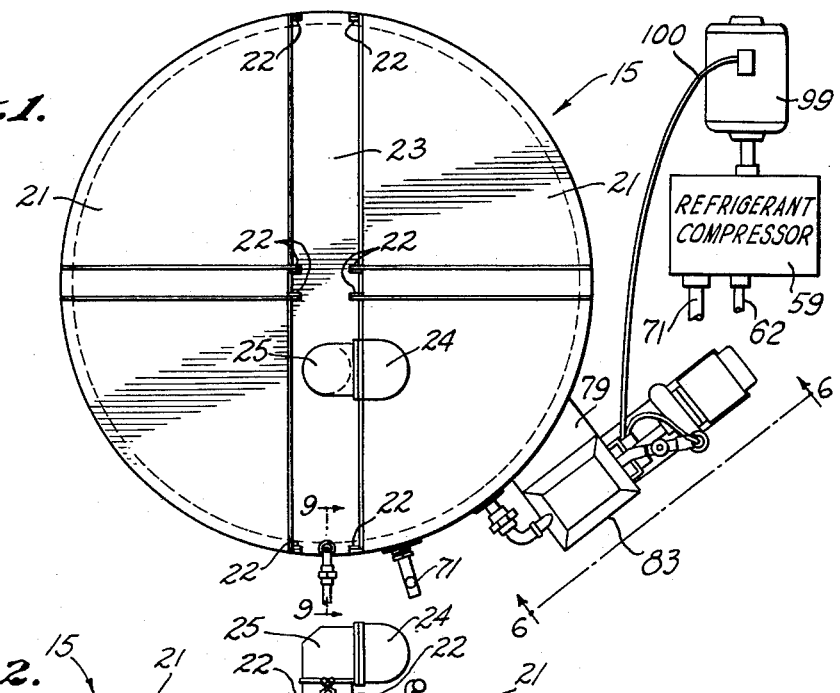
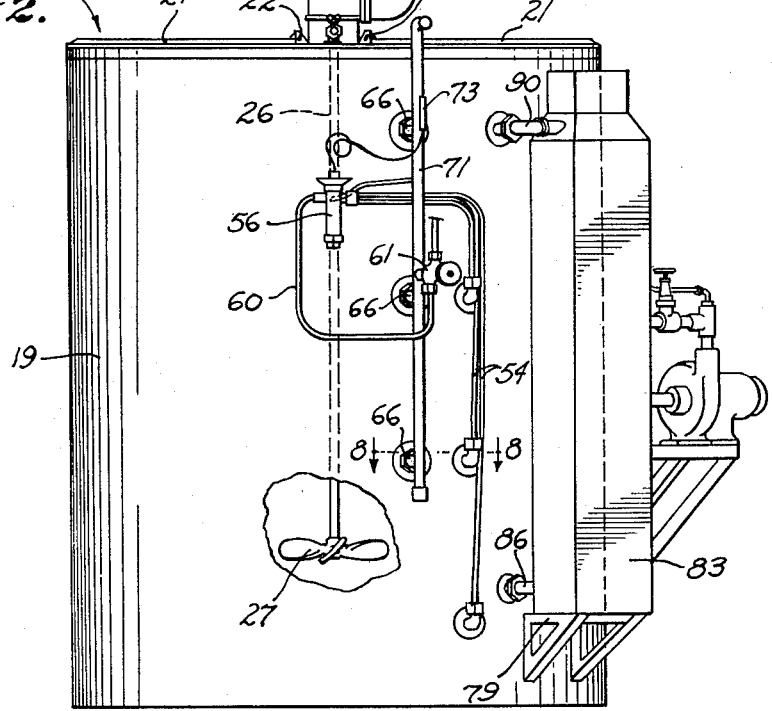
INVENTOR:
FRANK J. ZAMBONI
BY
ATTORNEY

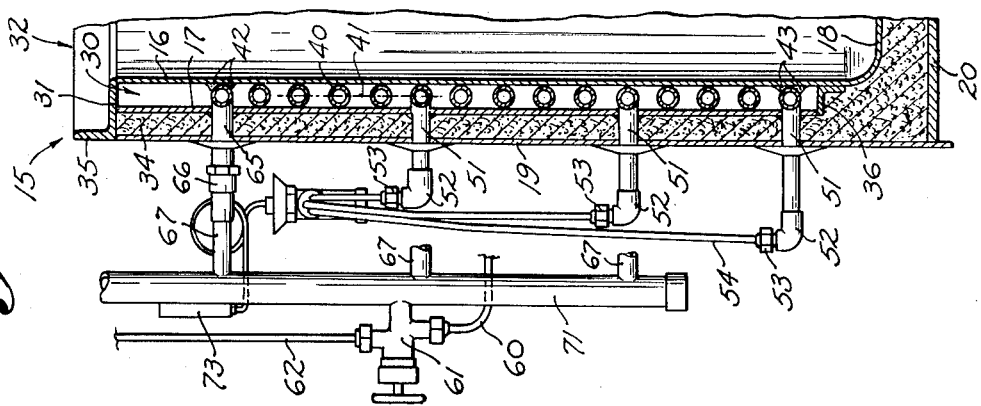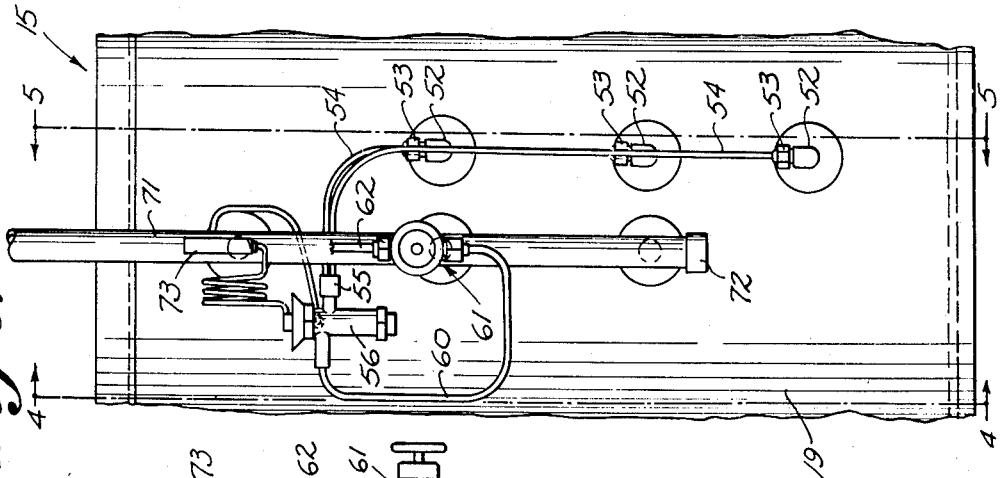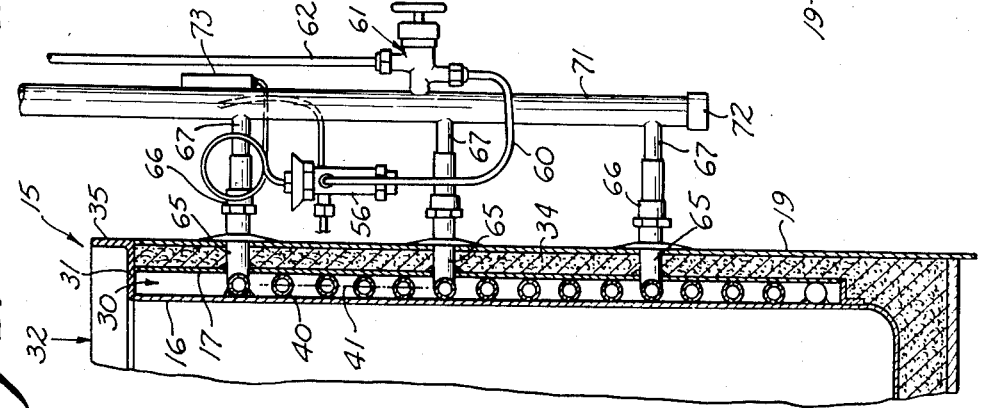

March 13, 1956  F. J. ZAMBONI  2,738,170
REFRIGERATED MILK STORAGE TANK AND PASTEURIZER
Filed July 25, 1949  3 Sheets-Sheet 3
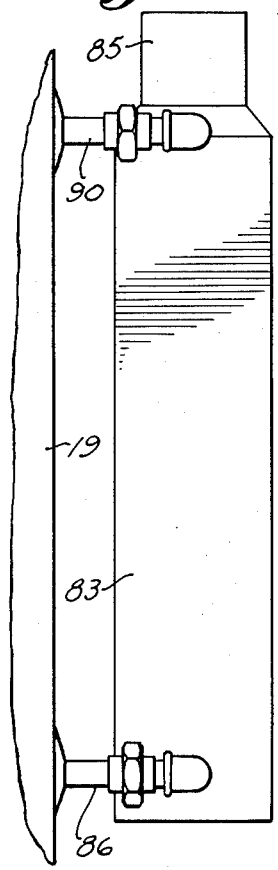
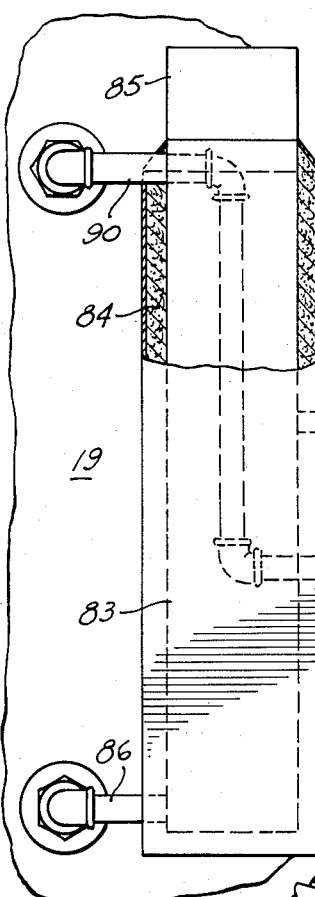
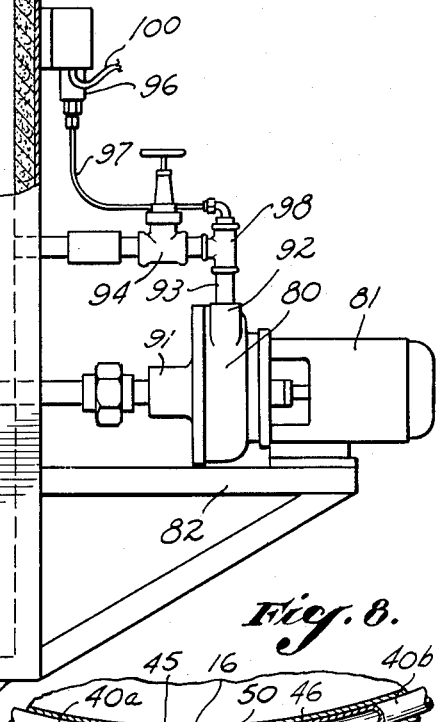
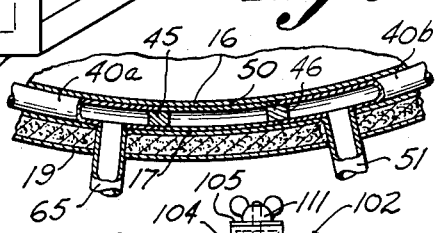
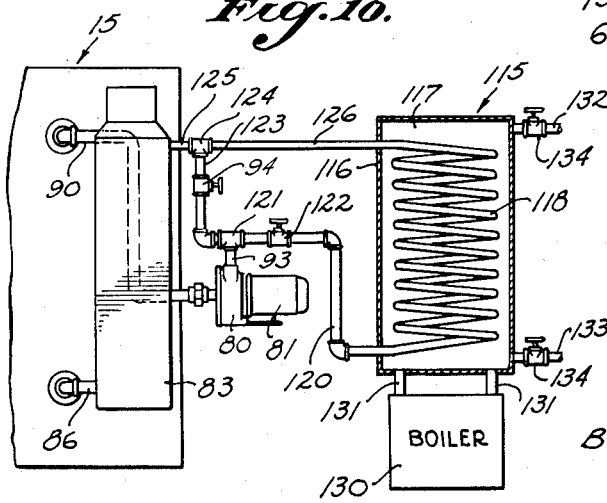
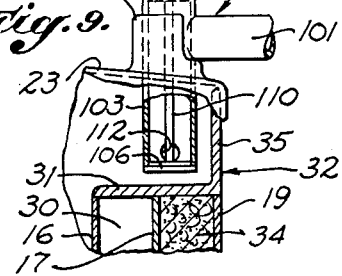
INVENTOR:
FRANK J. ZAMBONI
BY
ATTORNEY

United States Patent Office 2,738,170
Patented Mar. 13, 1956

2,738,170

REFRIGERATED MILK STORAGE TANK AND PASTEURIZER

Frank J. Zamboni, Paramount, Calif.

Original application July 25, 1949, Serial No. 106,513, now Patent No. 2,594,603, dated April 29, 1952. Divided and this application March 3, 1952, Serial No. 274,579

3 Claims. (Cl. 257—10)

The present invention is a division of my pending application Serial No. 106,513, filed July 25, 1949, now Patent No. 2,594,603, granted April 29, 1952, entitled Refrigerated Liquid Storage Tank, and relates to refrigerated storage tanks. More specifically, this invention has to do with a tank particularly designed for refrigerating and pasteurizing milk at the dairy farms or other milk producing centers until the same can be picked up by tank truck for delivery to the creamery or dairy. Such tanks are usually quite sizeable, and may range up to several thousand gallons of capacity.

Owing to the extremely perishable nature of milk and the exacting standards that prevail in the diary industry throughout most of the country, it is necessary to chill the milk immediately from body heat to approximately 40° F., and then hold the milk at 40° until it is picked up by the tank truck. The milk may be collected from several milkings during the day, and at each milking, a large volume of warm milk is added suddenly to the previously collected milk which has been chilled to 40° F. One of the problems with which the present invention is concerned is that of providing a refrigerating system capable of handling the severe load imposed by the sudden addition of several hundred gallons of warm milk to the tank, with no more than insignificant rise in temperature of the milk already in the tank. The primary object of the invention, therefore, is to provide a new and improved refrigerated tank capable of chilling a large volume of warm milk almost instantly to the desired holding temperature as the milk is poured into the tank, and thereafter holding the milk at a substantially constant, predetermined temperature.

A number of novel features in the present invention contribute to the attainment of this object. For one thing, in the preferred form of my invention the tank is made with inner and outer walls which are spaced apart by a refrigerant pipe wound around the inner tank wall. The pipe is interrupted at intervals along its length to provide a plurality of shorter sections, each of which is closed off from its adjoining sections, and each section being provided with its own refrigerant liquid line and suction line. This arrangement provides the necessary length of refrigerant pipe required to handle the heat transfer load, but without the excessive pressure drop which would result if the pipe were made continuous, with a single liquid line and a single suction line.

Another factor contributing substantially to the efficient transfer of heat from the milk to the refrigerating equipment is the use of a liquid, such as water or brine, to fill the space between the inner and outer walls of the tank and to conduct the heat more rapidly and uniformly from the entire area of the inner wall to the entire area of the refrigerant pipe; the said liquid being preferably circulated through the spiral channel defined between adjacent coils of the pipe under conditions such that the pressure of the fluid against the side walls of the tank is always below the static head. In the preferred form of the invention, the pressure of the fluid is reduced to such an extent that the pressure at all points is subatmospheric, so that the walls are pressed together by atmospheric pressure and held firmly against the spacers between them. This is an important feature, as it eliminates the need for welding or otherwise tying the spacers to the side walls so as to hold the latter together.

To the best of my knowledge, all prior double-walled refrigeration panels or tanks having a liquid medium circulating therein have been constructed with internal spacers to which the side walls have been welded or otherwise tied, and the circulation of fluid has been accomplished by pumping the fluid under a positive pressure through the passages between the spacers. The increased fluid pressure necessary to overcome the frictional losses due to circulation tends to spread the walls apart, with the result that the welds between the walls and spacers are constantly placed under tension and frequently fail. In the present invention, circulation of the liquid medium is obtained by applying a suction at one end of the passage, while the other end of the passage is supplied with liquid at atmospheric pressure. As a result of this arrangement, the pressure exerted by the fluid against the walls is diminished during circulation, and the side walls are pressed together against opposite sides of the spacers by atmospheric pressure, instead of being pulled apart.

Another object of the invention is to provide a new and improved apparatus for pasteurizing milk, and more specifically, to provide a tank that can be operated optionally as either a refrigerated storage tank or as a pasteurizing apparatus. In this connection, I have provided means for either refrigerating the liquid medium circulating through the double walls of the tank, or for heating the same up to pasteurizing temperature.

Still a further object of the invention is to provide a tank of the type described wherein the heated liquid medium in the circulatory system of the tank may be precooled with cold water from a well or other source of water before turning on the refrigerating machine, thereby extracting a substantial portion of the heat of pasteurization from the milk, and relieving the refrigeration equipment of a considerable load.

The foregoing and other objects and advantages of the present invention will become apparent to those skilled in the art upon consideration of the following detailed description of the preferred embodiment thereof, reference being had to the accompanying drawings, wherein:

Figure 1 is a top plan view of a refrigerated liquid storage tank of the type used in my invention;

Figure 2 is a side elevational view of the same;

Figure 3 is an enlarged fragmentary elevational view of a portion of the outside of the tank, showing the liquid refrigerant lines and the suction line header;

Figure 4 is a sectional view through the same, taken at 4—4 in Figure 3;

Figure 5 is another sectional view through the tank, taken at 5—5 in Figure 3;

Figure 6 is an enlarged, partially cutaway elevational view of the make-up tank and circulating pump, as seen from 6—6 in Figure 1;

Figure 7 is an elevational view of the make-up tank, as seen from the left-hand side in Figure 6;

Figure 8 is an enlarged fragmentary horizontal section through the tank wall at the top end of one portion of the refrigerant pipe and at the bottom end of the next portion;

Figure 9 is an enlarged sectional view through the top corner of the tank, taken at 9—9 in Figure 1, showing the ledge at the top edge of the refrigerated wall and the nozzle for discharging milk lengthwise along the ledge; and Figure 10 is a more or less schematic drawing, showing the arrangement with which the present application is particularly concerned, wherein the liquid medium circulating through the double walls of the tank may be heated for the purpose of pasteurizing the milk.

Figures 1 to 9, inclusive, illustrate details of the tank itself, which is claimed in my pending application, Serial No. 106,513. The tank is designated in its entirety by the reference numeral 15 and is seen to comprise inner and outer side walls 16 and 17, a bottom 18, outer shell 19, and base plate 20. The inner wall 16 and the bottom 18 are preferably fabricated of stainless steel for sanitary reasons, although the outer wall 17 and shell 19 may be made of common steel or any other suitable material. The tank 15 is preferably, although not necessarily, cylindrical in shape, with its top end closed by two semi-circular covers 21 which are hinged at 22 to a transversely extending bridge portion 23 extending across the top of the tank from one side thereof to the other. Mounted on the bridge member 23 to one side of center is an electric motor 24 and gear box 25, which drive a shaft 26 extending down into the interior of the tank; said shaft having a propeller 27 affixed to the bottom end thereof, which serves to agitate the milk so that a representative sample of the same can be taken for tests as to butter fat content.

The inner and outer walls 16 and 17 are concentric with one another and are spaced apart a short distance, forming a narrow, annular chamber 30, which is closed at its top end by the horizontal flange 31 of an angle member 32. The outer shell 19 is also concentric with the outer wall 17 and is spaced outwardly therefrom a few inches to form a space which is filled with thermal insulation 34; the shell 19 being welded to the corner of the angle member 32 flush with the vertical flange 35 thereof. At its bottom end, the chamber 30 is closed by the horizontal flange of another angle member 36, the vertical flange of which lies flat against the outside surface of the inner wall 16 and is welded thereto. The junctions of the walls 16 and 17 with the angle members 32 and 36 are welded in continuous seams, making the chamber 30 watertight.

Wrapped helically around the outside surface of the inner wall 16 is a refrigerant pipe 40, the coils of which are preferably spaced apart a few inches from one another, as shown in the drawings, so as to form a spiral passage 41 extending from the bottom end of the chamber 30 to a point adjacent the top end thereof. The pipe 40 is preferably continuous from end to end, and is attached for support to the inner wall 16 only at its extreme ends, such attachment being typically accomplished by welds 42 and 43. Tack welds may be used at other points along the length of the pipe, if necessary, to hold the coils tightly wrapped against the inner wall 16 during assembly of the tank, but such tack welds serve no structural function in the completed tank, and it is primarily the ends welds 42 and 43 that provide support for the pipe. The coils of pipe 40 bridge the space between the tank walls 16 and 17, thereby separating each turn of the passage 41 from the adjoining turn, and serving as spacers for the walls 16, 17, to hold the same apart when the pressure on the outside is greater than the pressure on the inside.

The relatively high rate of heat transfer called for during the peak load periods when warm milk is being poured into the tank necessitates the use of a considerable length of refrigerant pipe which, for practical considerations, is of relatively small cross-sectional area. The frictional resistance to high velocity flow of the refrigerant through such a pipe would be excessive if the liquid refrigerant were fed into the pipe at one end thereof and the suction line were connected to the other end, and in order to reduce the frictional losses to an acceptable level, I provide means for dividing the length of refrigerant pipe up into several shorter sections, each of which is separate from the adjoining sections and each having its own liquid line and suction line. To this end, the interior of the pipe 40 is plugged at intervals by pairs of plugs 45 and 46; plug 45 closing the top end of section 40a, and plug 46 closing the bottom end of section 40b. The continuity of the pipe 40 is preserved between sections by means of short lengths of blank filler tubing 50 of the same diameter as pipe 40, which are also welded to the plugs 45, 46. The several sections of the pipe 40 being thus closed off at their ends by plugs 45, 46, and the sections being joined by tubing 50, the refrigerant pipe 40 is, in effect, a single, continuous piece of pipe, which, as mentioned earlier, is attached at its extreme ends to the inner wall 16 by welds 42 and 43.

Connected into the bottom end of each of the short sections of the refrigerant pipe 40 and projecting radially outward therefrom is a short length of pipe 51 which is connected at its outer end by an elbow 52 and reducer 53 to a length of small diameter tubing 54; the several lengths of tubing 54 being brought together and connected by a coupling member 55 to a multi-jet thermal-expansion valve 56. The liquid refrigerant is delivered to the expansion valve 56 through tubing 60 and a liquid line 62, the latter being connected to the receiver of a refrigerant compressor 59 in a manner well understood by those skilled in the art. A manually controlled shut-off valve 61 between tubing 60 and line 62 permits the refrigerant to be shut off altogether when so desired.

Connected into the top end of each of the short sections of refrigerant pipe 40 is a pipe 65 which is connected by a coupling 66 to one branch 67 of a suction line header 71. The header 71 is a vertical pipe having a cap 72 on its bottom end, and the top end thereof is connected to the suction line of the refrigerant compressor 59.

The thermal-expansion valve 56 functions to reduce the fluid pressure of the liquid refrigerant and to supply the refrigerant uniformly to the several short sections of pipe 40, and is opened or closed by a thermal bulb 73 that is clamped against one side of the suction line header 71. When the suction line 71 becomes colder, the thermal bulb 73 causes the expansion valve 56 to cut down the supply of liquid refrigerant, and when the suction line becomes warmer, the expansion valve 56 is opened wider to allow more liquid refrigerant to enter the pipe 40.

The chamber 30 between the tank walls 16 and 17 is filled with water, brine, or anti-freeze solution and is circulated through the passage 41 by a pump 80 which is driven by an electric motor 81. The pump and motor are mounted on a platform 82 projecting outwardly from one side of a make-up tank 83 which is supported, in turn, on a platform 79 projecting outwardly from the shell 19 near the bottom edge of the tank. The make-up tank 83 is preferably rectangular in cross-section, and only slightly shorter than the tank 15; the top end of the make-up tank being just below the level of the tank top. The make-up tank 83 is of double-wall construction for the greater part of its length, and the space between the walls is filled with insulation 84 so as to minimize the transfer of heat from the atmosphere to the water circulating through the passages of the tank. The inner wall 85 of the make-up tank is open at its top end to the atmosphere, and the bottom end thereof is connected by a pipe 86 to the bottom end of the fluid passage 41. The top end of the fluid passage 41 is connected by another pipe 90 to the suction side 91 of the pump 80; the pipe 90 entering the top end of the make-up tank 83, then passing downwardly through the center thereof, and coming out the other side of the tank for connection to the pump. The discharge side 92 of the pump is connected by a pipe 93 to the interior of the make-up tank 83, and a valve 94 is connected into the pipe 93 to enable the circulation to be blocked at this point, for reasons that will be pointed out hereinafter.

From the foregoing description it will be seen that the circulation of the water or brine through the passages 41 is effected by the suction of the pump 80 instead of by pressure, as in the usual installation. The liquid entering the bottom end of the passage 41 is merely drawn from the make-up tank 83, which, as explained earlier, is open to the atmosphere and therefore under no pressure. The pressure difference required to circulate the water through the passages 41 is thus produced by reducing the pressure at the exit rather than by increasing the pressure at the entrance, with the result that the water within the chamber 30 exerts less pressure against the walls 16 and 17 of the tank when the pump 80 is operating than when the pump is at rest. In the preferred form of the invention, the fluid pressure of the water within chamber 30 is reduced to a subatmospheric pressure so that the walls 16, 17 are pressed together by atmospheric pressure against opposite sides of the pipe 40. The principal advantage of this arrangement is that it completely eliminates the need for tying the two walls together so as to prevent their separation. Another advantage is that a better contact between each of the walls 16, 17 and the pipe 40 is obtained, with the result that there is little or no leakage of the water from one turn of the passage 41 into the adjoining turns thereof.

Mounted on the outside of the make-up tank 83 is a pressure switch 96 which is connected by tubing 97 to a T-fitting 98 between the pump discharge pipe 93 and valve 94. The switch 96 is connected by electric wires 100 to the motor 99 of the refrigerant compressor 59 and functions to prevent the machine from operating until the water is circulating freely through the tank 15. Thus, if the water within the passages 41 should freeze up solid, causing the circulation to be stopped or greatly reduced, the change in pressure at the T-fitting 98 actuates the switch 96, keeping the refrigerating machine from starting up until the ice has melted and circulation is restored. As soon as the water is circulating freely, switch 96 turns on the motor 99 of the refrigerating machine.

Figure 9 shows the arrangement whereby warm milk emptied into the tank is distributed evenly around the entire circumference of the tank and caused to run down the inside surface of the cold inner wall 16 in a thin, even film, so that the milk is chilled down to approximately 40° F. before it reaches any milk in the bottom of the tank held over from previous milkings. The milk is conveyed to the tank 15 through a pipe (not shown) which is connected by a suitable coupling to a horizontal branch 101 of a T-shaped distributor nozzle 102. The other branch 103 of the nozzle extends down through a holder 104 on the bridge member 23 and terminates a short distance above the horizontal flange 31 of the angle iron 32. The top and bottom ends of the vertical branch 103 of the nozzle are closed by plugs 105 and 106, which are removable to permit a brush to be passed clear through for ease in cleaning. The bottom plug 106 has a stem 110 projecting upwardly from its center, and the top end of the stem passes through a hole in plug 105 and is threaded to receive a wing nut 111.

Holes 112 are drilled through the bottom end of the branch 103 on opposite sides thereof, and the milk is discharged through these holes in two oppositely directed streams that travel longitudinally along the shelf 31. The shelf 31 may be flat and substantially horizontal, as shown in Figure 9, or it may be formed with a raised lip or bead along its inner edge, or inclined in one direction or the other. When the shelf is flat and horizontal, the stream of milk is carried by its own momentum around almost to the other side of the tank; centrifugal force acting generally to hold the stream back away from the inner edge of the shelf except for a gradual and progressive breaking of the stream over the edge. With the two streams of milk leaving the nozzle at the proper velocity, the milk breaks uniformly over the inner edge of the shelf 31 around the entire circumference of the tank, and runs down the refrigerated wall 16 in a thin, even sheet, giving up its heat almost instantly and being chilled down to 40° F.

Figure 10 shows the arrangement with which the present invention is particularly concerned, whereby the water in the system may be heated so that the milk in the tank can be pasteurized. To that end, there is provided a heat exchanger 115 comprising a tank 116 enclosing a chamber 117, in which is contained a coil 118 of pipe. The bottom end of the coil is carried out through the side wall of the tank 116 and is connected by a pipe 120 to a T-fitting 121 on the pump discharge pipe 93. A shut-off valve 122 is connected into the pipe 120, and the valve 94 is moved to the position shown in Figure 10. The side of valve 94 opposite the pump is connected by a pipe 123 to a T-fitting 124, one branch of which is connected by a pipe 125 to the make-up tank 83, and the other branch being connected by a pipe 126 to the top end of the coil 118.

A boiler 130 is located below the tank 116 and is connected therewith by pipes 131, so that hot water or steam from the boiler is discharged into the chamber 117, where it heats the water in the pipe coil 118. Also opening into the chamber 117 are two pipes 132 and 133, the former being connected to a source of cold or cool water, such as from a well, and the latter being connected to a drain. Shut-off valves 134 permit the pipes 132, 133 to be closed off when they are not needed.

When the tank 15 has been filled to capacity and it is desired to pasteurize the milk, the refrigerating machine is shut off and the boiler 130 started up. Valve 94 is then closed and valve 122 is opened. Operation of the pump 80 now causes the water in the system to circulate through the coils 118, where it is heated until the milk has been raised to the pasteurizing temperature of 143° F. The milk is held at this temperature for 30 minutes, and the boiler 130 is then shut off altogether. Valves 134 are then opened to flood the chamber 117 with cold water, which serves to extract a considerable amount of heat from the milk in tank 15 and from the water circulating within the double walls thereof. As soon as the milk has been cooled down to a predetermined temperature, the valves 134 are closed; valve 122 is closed; and valve 94 is opened. This restores the circulation of the water to its original circuit, and the refrigeration machine is then turned on to chill the milk back down to the holding temperature of 40° F.

One extremely advantageous feature of my invention resides in the fact that in case of failure of the refrigeration machine, the milk in the tank 15 can be kept cool enough to delay souring for a considerable length of time by merely running cold water from a well or other source down into the bottom end of the open make-up tank 83 through a rubber hose or length of pipe. The cold water is drawn into the chamber 30 and along the passage 41 by the pump 80, and after completing the circuit and extracting as much heat as it can from the milk, discharged into the upper portion of the make-up tank, where it overflows and is allowed to run off as waste. This is, of course, strictly an emergency measure, but its effectiveness has been proved on several occasions when refrigeration equipment as failed, and thousands of gallons of milk have been saved from spoilage.

While I have shown and described in considerable detail what I believe to be the preferred embodiment of my invention, it should be understood that such details are merely illustrative, and various changes may be made in the shape and arrangement of the several parts without departing from the broad scope of the invention as defined in the appended claims.

I claim:

1. A combined refrigerated milk storage tank and pasteurizer comprising inner and outer walls, a refrigerant pipe wrapped around said inner wall and cooperating with said walls to form a passage extending from one extremity of said tank to the other, said passage being filled with water, a pump connected to said passage to circulate said water, a heat exchanger comprising a chamber having a pipe coil disposed therein, said pipe coil being connected to said pump, valve means for bypassing the water from said pump to said pipe coil, a heater connected to said chamber and operable to heat the water within said coil to pausteurizing temperature, said chamber being also connectable to a source of cold water controlled by shut-off valves, whereby said chamber can be flooded with cold water after pasteurization of the milk has been completed and said heater has been shut off, so as to cool the circulating hot water in said coil and thereby aid in extracting heat rapidly from the hot milk.

2. A combined refrigerated milk storage tank and pasteurizer comprising spaced inner and outer walls, a refrigerant pipe wrapped around said inner wall and bridging the space between said inner and outer walls, said pipe forming a passageway extending from one extremity of said tank to the other, said passageway being filled with water, a pump having its suction side connected to one end of said passageway, a reservoir connected to the other end of said passageway and open to the atmosphere, said pump discharging into said reservoir and drawing said water thru said passageway under sub-atmospheric pressure, a heat exchanger comprising a chamber having a pipe coil disposed therein, said pipe coil being connected to said pump, valve means for by-passing the water from said pump to said pipe coil, a heater connected to said chamber and operable to heat the water within said pipe coil to pasteurizing temperature, said chamber being also connectable to a source of cold water controlled by shut-off valves, whereby said chamber can be flooded with cold water after pasteurization of the milk has been completed and said boiler has been shut off, so as to cool the circulating hot water in said coil and thereby aid in extracting heat rapidly from the hot milk.

3. A milk storage tank having water passageways provided therein, said passageways being normally filled with water, a pump connected to said passageways to circulate the water contained therein, a heat exchanger comprising a water-filled chamber having a pipe coil disposed therein, said pipe coil being connected to said pump, valve means for by-passing the water from said pump to said pipe coil, means for heating the water within said chamber to pasteurizing temperature, said chamber being also connectable to a source of cold water controlled by shut-off valves, whereby said chamber can be flooded with cold water after pasteurization of the milk has been completed and said heating means has been shut off, so as to cool the circulating hot water in said coil and thereby aid in extracting heat rapidly from the hot milk.

References Cited in the file of this patent

UNITED STATES PATENTS

| | | |
|---|---|---|
| 1,240,869 | Noble | Sept. 25, 1917 |
| 2,217,702 | Kleist | Oct. 15, 1940 |
| 2,252,173 | Gibson | Aug. 12, 1941 |
| 2,471,538 | Oaks | May 31, 1949 |